(12) United States Patent
Park et al.

(10) Patent No.: US 10,976,416 B2
(45) Date of Patent: Apr. 13, 2021

(54) BEAM SCANNING APPARATUS AND OPTICAL APPARATUS INCLUDING THE SAME

(71) Applicant: SAMSUNG ELECTRONICS CO., LTD., Suwon-si (KR)

(72) Inventors: Junghyun Park, Seoul (KR); Byunggil Jeong, Anyang-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 596 days.

(21) Appl. No.: 15/882,488

(22) Filed: Jan. 29, 2018

(65) Prior Publication Data

US 2019/0011535 A1 Jan. 10, 2019

(30) Foreign Application Priority Data

Jul. 10, 2017 (KR) ........................ 10-2017-0087281

(51) Int. Cl.
*G01S 7/481* (2006.01)
*G01S 17/08* (2006.01)
(Continued)

(52) U.S. Cl.
CPC ............ *G01S 7/4817* (2013.01); *G01S 17/08* (2013.01); *G02B 5/1809* (2013.01);
(Continued)

(58) Field of Classification Search
CPC ..... G01S 7/4817; G01S 17/08; G02B 26/124; G02B 26/106; G02B 26/101;
(Continued)

(56) References Cited

U.S. PATENT DOCUMENTS

| | | |
|---|---|---|
| 4,070,089 A | 1/1978 | Grafton |
| 5,565,870 A | 10/1996 | Fukuhara et al. |

(Continued)

FOREIGN PATENT DOCUMENTS

| | | |
|---|---|---|
| CN | 103367930 B | 3/2017 |
| EP | 2921877 A2 | 9/2015 |

(Continued)

OTHER PUBLICATIONS

Yu, et al., "Light Propagation with Phase Discontinuities: Generalized Laws of Reflection and Refraction", Science vol. 334, Oct. 21, 2011, pp. 333-337 (6 pages total).

(Continued)

*Primary Examiner* — Daniel L Murphy
(74) *Attorney, Agent, or Firm* — Sughrue Mion, PLLC

(57) ABSTRACT

A beam scanning apparatus capable of adjusting a refraction angle of transmitted light and scanning a beam to a desired location is provided. In addition, an optical apparatus capable of sensing light reflected from an external object and extracting information about the external object is provided. The beam scanning apparatus includes a rotary meta lens having a plurality of meta areas in which a plurality of fine phase shift elements are arranged, and a rotation drive device that rotates the rotary meta lens. The plurality of meta areas are configured to direct transmitted light to different locations in a scanning area.

22 Claims, 16 Drawing Sheets

(51) Int. Cl.
*G02F 1/29* (2006.01)
*G02B 26/12* (2006.01)
*G02B 26/10* (2006.01)
*G02B 5/18* (2006.01)
*B82Y 20/00* (2011.01)
*G02B 1/00* (2006.01)
*G02B 26/00* (2006.01)

(52) U.S. Cl.
CPC ......... *G02B 26/101* (2013.01); *G02B 26/106* (2013.01); *G02B 26/124* (2013.01); *G02F 1/293* (2013.01); *B82Y 20/00* (2013.01); *G02B 1/002* (2013.01); *G02B 26/008* (2013.01); *G02B 2207/101* (2013.01)

(58) Field of Classification Search
CPC .................. G02B 5/1809; G02B 1/002; G02B 2207/101; G02B 26/008; G02F 1/293; B82Y 20/00
USPC ....................................................... 356/4.01
See application file for complete search history.

(56) References Cited

U.S. PATENT DOCUMENTS

| | | |
|---|---|---|
| 5,903,386 A | 5/1999 | Mantravadi et al. |
| 6,526,074 B1 | 2/2003 | Shim |
| 8,767,190 B2 | 7/2014 | Hall |
| 9,170,348 B2 * | 10/2015 | Abbaspour-Tamijani .................... G02B 27/123 |
| 2009/0225386 A1 | 9/2009 | Hayashi et al. |
| 2012/0268802 A1 | 10/2012 | Nagasaka et al. |
| 2016/0316180 A1 | 10/2016 | Han et al. |
| 2017/0040711 A1 | 2/2017 | Rakib et al. |
| 2017/0153527 A1 | 6/2017 | Kim et al. |

FOREIGN PATENT DOCUMENTS

| | | | |
|---|---|---|---|
| EP | 3290951 A1 * | 3/2018 | ............. G01S 17/42 |
| JP | 2002-071801 A | 3/2002 | |
| JP | 2016-205884 A | 12/2016 | |
| KR | 10-1450577 B1 | 10/2014 | |
| WO | 2016186816 A1 | 11/2016 | |

OTHER PUBLICATIONS

Arbabi et al., "Dielectric metasurfaces for complete control of phase and polarization with subwavelength spatial resolution and high transmission", Nature Nanotechnology, vol. 10, Nov. 2015, pp. 937-944 (8 pages total).

Communication dated Oct. 25, 2018, from the European Patent Office in counterpart European Application No. 18158677.7.

* cited by examiner

BEAM SCANNING APPARATUS AND OPTICAL APPARATUS INCLUDING THE SAME

CROSS-REFERENCE TO RELATED APPLICATION

This application claims priority from Korean Patent Application No. 10-2017-0087281, filed on Jul. 10, 2017, in the Korean Intellectual Property Office, the disclosure of which is incorporated herein in its entirety by reference.

BACKGROUND

1. Field

Apparatuses consistent with exemplary embodiments relate to a beam scanning apparatus and an optical apparatus including the same, and more particularly, to a beam scanning apparatus capable of adjusting a refraction angle of transmitted light and scanning a beam to a desired location, and an optical apparatus configured to sense light reflected from an external object and extract information about the external object.

2. Description of the Related Art

Recently, advanced driving assistance systems (ADASs) having various functions have been commercialized. For example, vehicles having a function, such as adaptive cruise control (ACC) or an autonomous emergency braking (AEB) system, have increased. ACC is characterized in that a location and a speed of other vehicles are recognized, and when there is a risk of collision, a speed of a vehicle is decreased, and when there is no risk of collision, the vehicle is driven within a pre-set speed range; and an AEB system is characterized in that when a front vehicle is recognized and there is a risk of collision, but a driver does not react to this situation or reacts inappropriately, autonomous braking is performed to prevent the collision. Also, it is expected that vehicles capable of autonomous driving will be commercialized in the near future.

Accordingly, interest in optical measuring apparatuses for providing information regarding the surroundings with respect to a vehicle has increased. For example, a vehicle light detection and ranging (LiDAR) apparatus may provide information regarding a distance between a vehicle and an object near the vehicle, a relative speed, an azimuth, etc. by irradiating a laser beam to a selected area around the vehicle and detecting a reflected laser beam. To this end, a vehicle LiDAR apparatus includes a beam scanning apparatus for scanning light to a desired area.

In addition to the vehicle LiDAR apparatus, the beam scanning apparatus may also be used in a robot LiDAR apparatus, a drone LiDAR apparatus, a security intruder detection system, a subway door obstacle detection system, a depth sensor, a user face recognition sensor in mobile phones, augmented reality (Ar), a motion recognition and object profiling in TVs or entertainment devices, or another apparatus or system as would be understood by one of skill in the art.

A beam scanning apparatus may be a mechanical beam scanning apparatus or a non-mechanical beam scanning apparatus. For example, a mechanical beam scanning apparatus uses a method of rotating a light source itself, a method of rotating a mirror that reflects light, or a method of moving a spherical lens in a direction perpendicular to an optical axis. A non-mechanical beam scanning apparatus may use a semiconductor device or a method of electrically controlling the angle of reflected light by using a plurality of micro antenna arrays.

SUMMARY

Exemplary aspects will be set forth in part in the description which follows and, in part, will be apparent from the description, or may be learned by practice of the presented exemplary embodiments.

According to an aspect of an exemplary embodiment, a beam scanning apparatus includes a rotary meta lens having a plurality of meta areas in which a plurality of fine phase shift elements are arranged, and a rotation drive device that rotates the rotary meta lens, wherein the plurality of meta areas are configured to direct transmitted light to different locations in a scanning area.

The rotary meta lens may include a transparent substrate having a disc shape and the plurality of meta areas may be arranged in a circumferential direction of the substrate.

Arrangement of the plurality of fine phase shift elements may be different for each of the plurality of meta areas.

Each of the plurality of fine phase shift elements may have the form of a column arranged on the transparent substrate and have a refractive index higher than a refractive index of the transparent substrate.

Each of the plurality of meta areas may have at least two sub-areas having a same arrangement of the plurality of fine phase shift elements.

For each of the plurality of meta areas, the periods of the at least two sub-areas may be different.

The rotary meta lens may further include a plurality of meta areas additionally arranged in a radial direction of the transparent substrate.

The plurality of meta areas may be configured such that scanning positions of light that is transmitted through each of the plurality of meta areas are uniformly distributed within a scanning area.

The plurality of meta areas may be configured such that a scan density of scanning positions in a central part of the scanning area is higher than a scan density of scanning positions in a peripheral part of the scanning area.

The beam scanning apparatus may further include a polygon mirror that reflects light transmitted through the rotary meta lens and scans the light in one direction, and another rotation drive device that rotates the polygonal mirror.

The beam scanning apparatus may further include another rotary meta lens that changes a traveling direction of light transmitted through the rotary meta lens, and another rotation drive device that rotates the other rotary meta lens.

The other rotary meta lens may have a plurality of meta areas in which a plurality of fine phase shift elements are arranged, and the plurality of meta areas of the other rotary meta lens may be configured to direct transmitted light to different locations in a scanning area.

The beam scanning apparatus may further include a mirror that reflects light transmitted through the plurality of meta areas, wherein the mirror may have a reflective surface inclined at 45 degrees with respect to a rotation axis of the rotary meta lens.

According to an aspect of another exemplary embodiment, an optical apparatus includes a light source, a beam scanning apparatus that scans light emitted from the light source, and a photodetector that senses light emitted from the light source and reflected from an external object, wherein the beam scanning apparatus includes a rotary meta lens having a plurality of meta areas in which a plurality of fine phase shift elements are arranged, and a rotation drive device that rotates the rotary meta lens, wherein the plurality of meta areas are configured to direct transmitted light to different locations in a scanning area.

The optical apparatus may further include a beam splitter that is disposed between the light source and the rotary meta lens, transmits the light emitted from the light source to the rotary meta lens, and reflects light reflected from an external object to the photodetector.

The optical apparatus may further include a calculator that calculates information about a location of an external object, based on a measurement result of the photodetector.

The rotary meta lens may include a transparent substrate having a disc shape and the plurality of meta areas may be arranged in a circumferential direction of the substrate.

Arrangement of the plurality of fine phase shift elements may be different for each of the plurality of meta areas.

Each of the plurality of fine phase shift elements may have the form of a column arranged on the transparent substrate and have a refractive index higher than a refractive index of the transparent substrate.

The plurality of meta areas may be further divided in a radial direction of the substrate.

The beam scanning apparatus may further include a polygon mirror that reflects light transmitted through the rotary meta lens and scans the light in one direction, and another rotation drive device that rotates the polygonal mirror.

The beam scanning apparatus may further include another rotary meta lens that changes a traveling direction of light transmitted through the rotary meta lens, and another drive device that rotates the other rotary meta lens.

The beam scanning apparatus may further include a mirror that reflects light transmitted through the plurality of meta areas, wherein the mirror may have a reflective surface inclined at 45 degrees with respect to a rotation axis of the rotary meta lens.

The optical apparatus may further include a synchronization device that senses a rotation of the rotary meta lens, wherein one of the plurality of meta areas of the rotary meta lens may be configured to direct light emitted from the light source toward the synchronization device.

The optical apparatus may be a distance sensor or a three-dimensional sensor.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
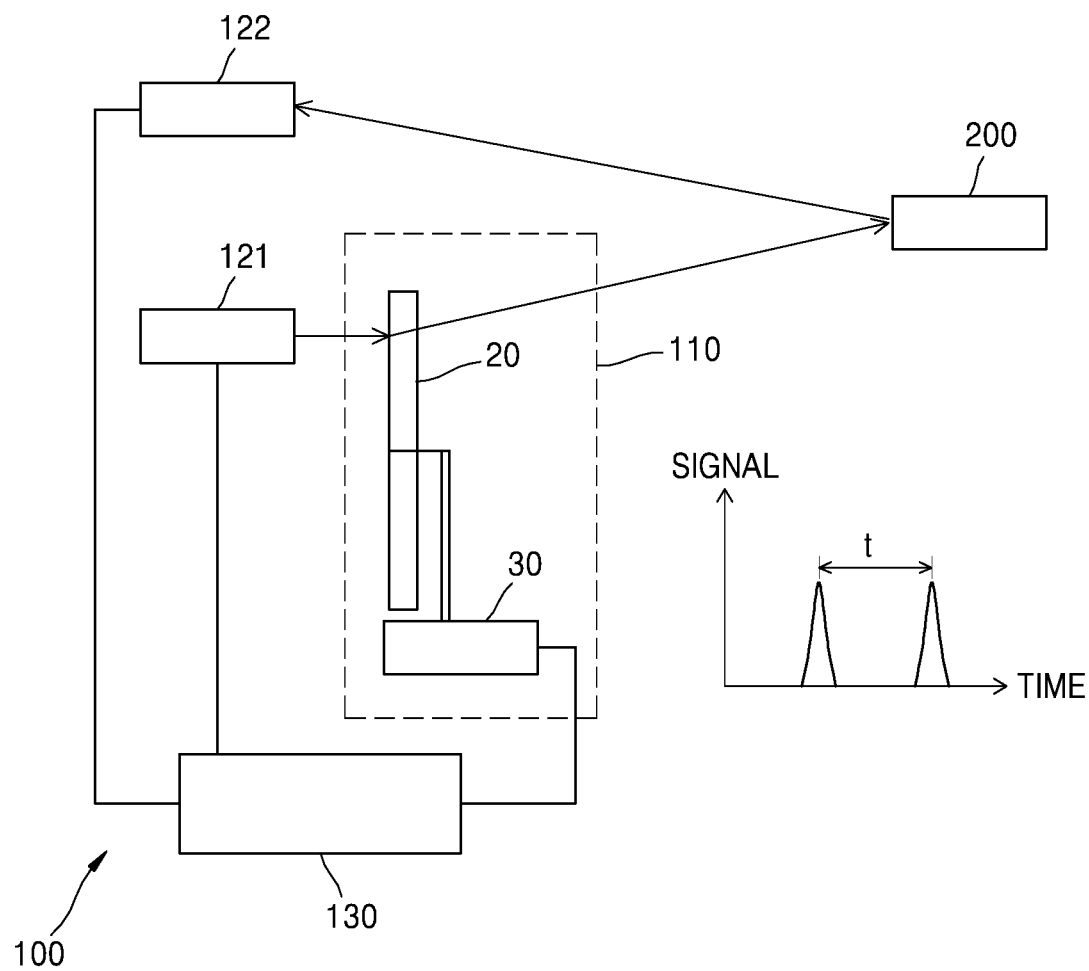
FIG. 1 is a block diagram of an optical apparatus including a beam scanning apparatus according to an exemplary embodiment.

Hereinafter, a beam scanning apparatus and an optical apparatus including the same will be described in detail with reference to the accompanying drawings. In the drawings, like reference numerals refer to like elements throughout, and sizes of components may be exaggerated for clarity and convenience of explanation. Also, embodiments described hereinafter are only examples and various modifications of the exemplary embodiments are possible. In addition, with respect to a layered structure described below, the expression "above" or "on" may denote not only direct contact from above/below/right/left, but also indirectly above/below/right/left without contact.

FIG. 1 is a block diagram of an optical apparatus 100 including a beam scanning apparatus according to an exemplary embodiment. Referring to FIG. 1, the optical apparatus 100 according to this exemplary embodiment includes a light source 121 for providing light, a beam scanning apparatus 110 for scanning light emitted from the light source 121, a photodetector 122 for sensing light emitted from the light source 121 and reflected from an external object 200, and a computer 130 for computing information about the external object 200 based on measurement results of the photodetector 122. The light source 121 may be a laser or a light-emitting diode (LED). The computer 130 may control operations of the beam scanning apparatus 110, the light source 121, and the photodetector 122. For example, the computer 130 may control switching the light source 121 on/off and switching the photodetector 122 on/off and may control a beam scanning operation of the beam scanning apparatus 110. The computer may operate according to software instructions recorded on a non-transitory recording medium, or may include dedicated hardware controlling the operations thereof.

The optical apparatus 100 may be, for example, a three-dimensional sensor such as a vehicle light detection and ranging (LiDAR) apparatus or a depth sensor used in a three-dimensional camera. The optical apparatus 100 may also be a robot LiDAR apparatus, a drone LiDAR apparatus, a security intruder detection system, a subway screen door obstacle detection system, a face recognition sensor, a motion recognition and object profiling apparatus, or another system or apparatus as would be understood by one of skill in the art. When the optical apparatus 100 is a vehicle LiDAR apparatus, the computer 130 may calculate information regarding a distance between a vehicle and an object in front of or behind the vehicle, or beside the vehicle, a relative speed, an azimuth position, etc. For example, a distance between the external object 200 and the beam scanning apparatus 110 may be determined by using a difference between the time when light is emitted from the light source 121 and the time when the light is detected by the photodetector 122, and an azimuth position of the external object 200 may be determined using a location at which the light is scanned by the beam scanning apparatus 110. Furthermore, a relative speed with respect to the object 200 may be determined based on a change in the difference between the time when the light is emitted from the light source 121 and the time when the light is detected by the photodetector 122. When the optical apparatus 100 is a distance sensor of a three-dimensional camera, the computer 130 may calculate information regarding distances to various objects within the field of view of the three-dimensional camera.

In order to obtain information about objects in a plurality of surrounding locations, the optical apparatus 100 may periodically irradiate light onto several surrounding areas by using the beam scanning apparatus 110. To this end, the beam scanning apparatus 110 may include a rotary meta lens 20 and a rotation drive device 30 for rotating the rotary meta lens 20. The rotation drive device 30 may include, for example, a motor and a power transmission device. Light emitted from the light source 121 is refracted while passing through the rotary meta lens 20, and the traveling direction of the light may be thereby be changed. The rotary meta lens 20 may have a plurality of areas comprising materials providing different refraction angles to light transmitted therethrough. Therefore, while the rotary meta lens 20 rotates, light may be irradiated in various directions while being transmitted through the plurality of areas providing different refraction angles.

Figure 2:
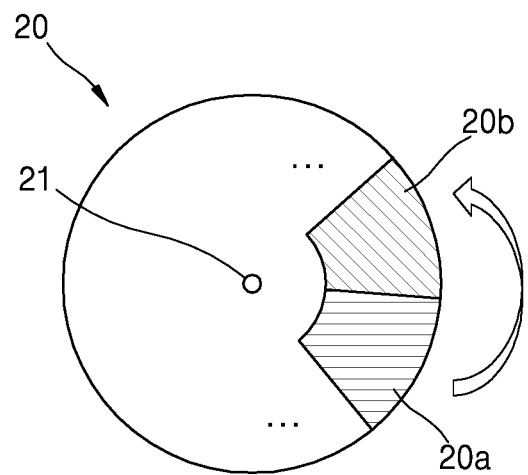
FIG. 2 is a plan view of a structure of a rotary meta lens according to an exemplary embodiment.

For example, FIG. 2 is a plan view of a structure of the rotary meta lens 20 according to an exemplary embodiment. Referring to FIG. 2, the rotary meta lens 20 has the shape of a disc in which a rotation axis 21 is formed at the center thereof, and may include a plurality of meta areas 20a and 20b formed by dividing the disc into sectors in a circumferential direction of the disk. Although only two meta areas 20a and 20b are shown in FIG. 2 for convenience, the rotary meta lens 20 may actually include a greater number of meta areas. For example, when the radius of the rotary meta lens 20 is 3 cm and the arc length of each of the meta areas 20a and 20b is 50 µm, the rotary meta lens 20 may include 3,768 meta areas. A plurality of fine phase shift elements 23 (see FIG. 5) are arranged in each of the meta areas 20a and 20b. Depending on the arrangement of the phase shift elements 23, a refraction angle of transmitted light passing through the meta areas 20a and 20b may vary. Accordingly, the plurality of meta areas 20a and 20b of the rotary meta lens 20 may direct the transmitted light in different directions on a scanning area.

Figure 3:
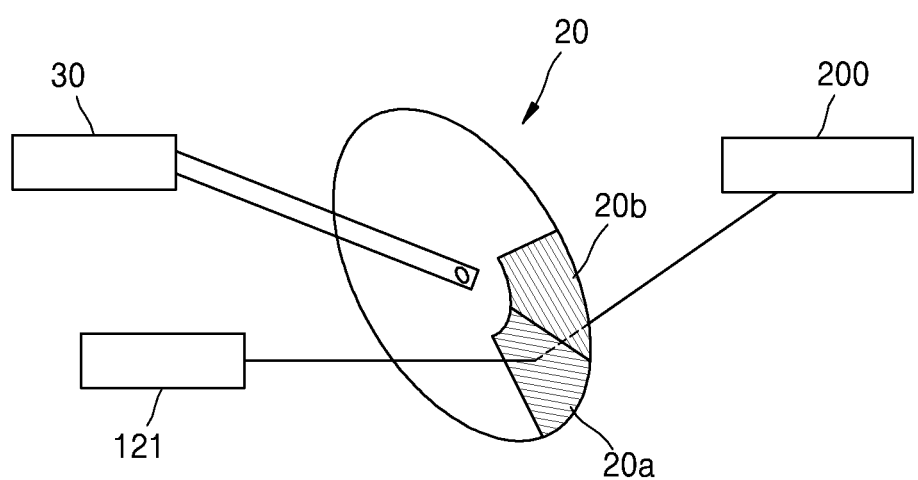
FIGS. 3 and 4 are views illustrating a principle of scanning a beam by using the rotary meta lens shown in FIG. 2.
Figure 4:
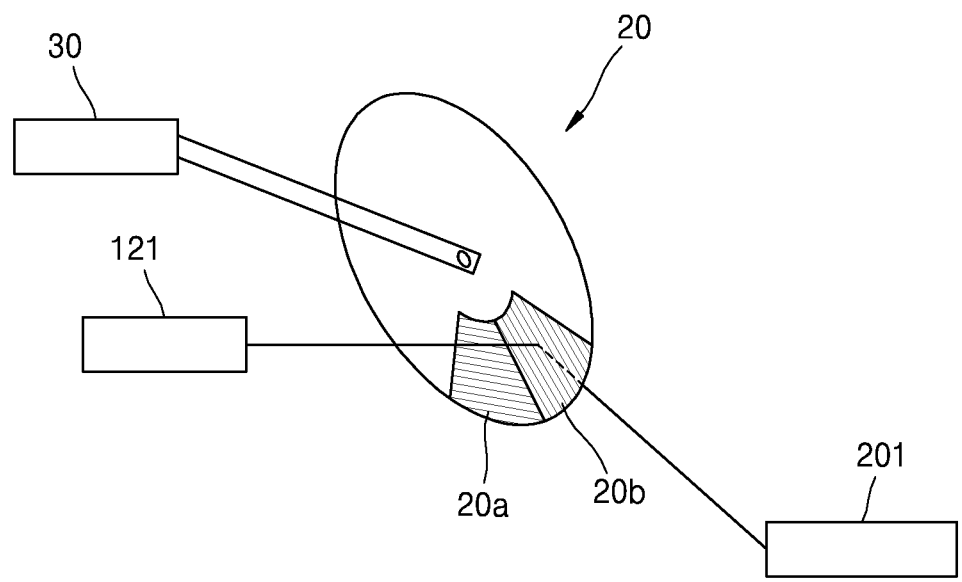

For example, FIGS. 3 and 4 are views illustrating a principle of scanning a beam by using the rotary meta lens 20 shown in FIG. 2. Referring to FIG. 3, light emitted from the light source 121 may pass through a first meta area (i.e., the meta area 20a) of the rotary meta lens 20. Light transmitted through the first meta area 20a may be incident on an object A 200 while being refracted at a first angle. And then, the rotary meta lens 20 may be rotated by the rotation drive device 30 so that the light emitted from the light source 121 may be transmitted through a second meta area (i.e., the meta area 20b) of the rotary meta lens 20. The light transmitted through the second meta area 20b may be incident on an object B 201 at a different location than the object A 200 while being refracted at a second angle. In this way, the rotary meta lens 20 may be rotated to direct light to a plurality of different locations. For example, when the radius of the rotary meta lens 20 is 3 cm and the arc length of each of the meta areas 20a and 20b is 50 µm, it is possible to scan 3,768 different locations.

Figure 5:
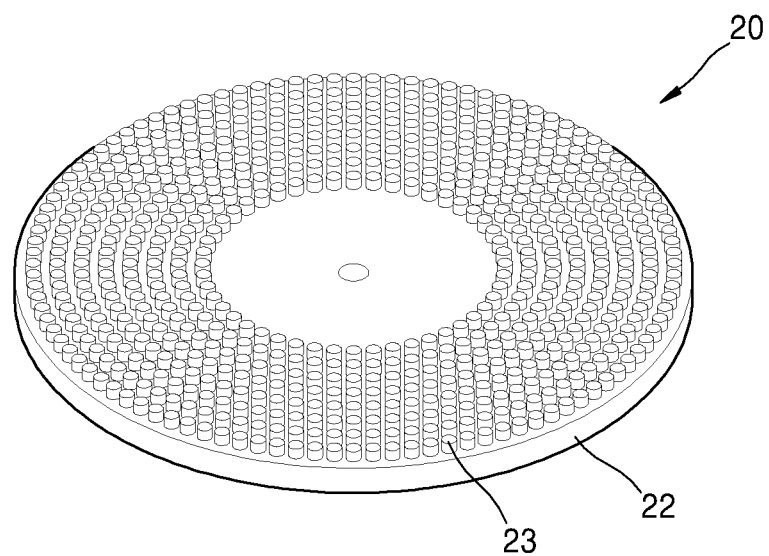
FIG. 5 is a perspective view illustrating a plurality of phase shift elements arranged in meta areas of a rotary meta lens according to an exemplary embodiment.

FIG. 5 is a perspective view illustrating a plurality of phase shift elements 23 arranged in meta areas of a rotary meta lens 20. Referring to FIG. 5, the rotary meta lens 20 may include a transparent substrate 22 having a disc shape and a plurality of phase shift elements 23 arranged on the substrate 22. The phase shift elements 23 may be arranged on the surface of the substrate 22. Also, the phase shift elements 23 may be arranged at regular intervals or at irregular intervals. As shown in FIG. 5, each of the phase shift elements 23 may have, for example, the form of a cylinder. However, the phase shift elements 23 are not limited thereto, and may have the form of radial symmetric polygonal columns, such as quadratic columns or hexagonal columns. These phase shift elements 23 may be easily formed using a general semiconductor patterning process. For example, after forming a phase shift element material layer on the surface of the substrate 22, the phase shift elements 23 may be simply formed by patterning the phase shift element material layer by using a photolithographic process and an etch process.

The substrate 22 may include transparent glass or a transparent plastic material in the form of a flat plate. The phase shift elements 23 may include a material having a refractive index higher than that of the substrate 22. For example, the phase shift elements 23 may include a high refractive index material such as germanium (Ge), amorphous silicon (a-Si), polycrystalline silicon (p-Si), monocrystalline silicon (c-Si), group III-V compound, $SiN_x$, $SiO_2$, TiO, $TiO_2$, $TiO_3$, GaP, $Al_2O_3$, or $HfO_2$. The refractive index of each of the phase shift elements 23 may be greater than 3.5, for example, at the wavelength of visible light.

When incident light passes through the phase shift element 23 having a high refractive index, the phase of transmitted light transmitted through the phase shift element 23 becomes different from the phase of the incident light, due to a phase delay by the phase shift element 23. The extent to which the phase of the transmitted light varies may be determined depending on the size and thickness of the phase shift element 23. When the phase shift element 23 is, for example, a cylinder or a polygonal column, the phase of the transmitted light transmitted through the phase shift element 23 varies depending on the diameter and thickness of the phase shift element 23.

Figure 6:
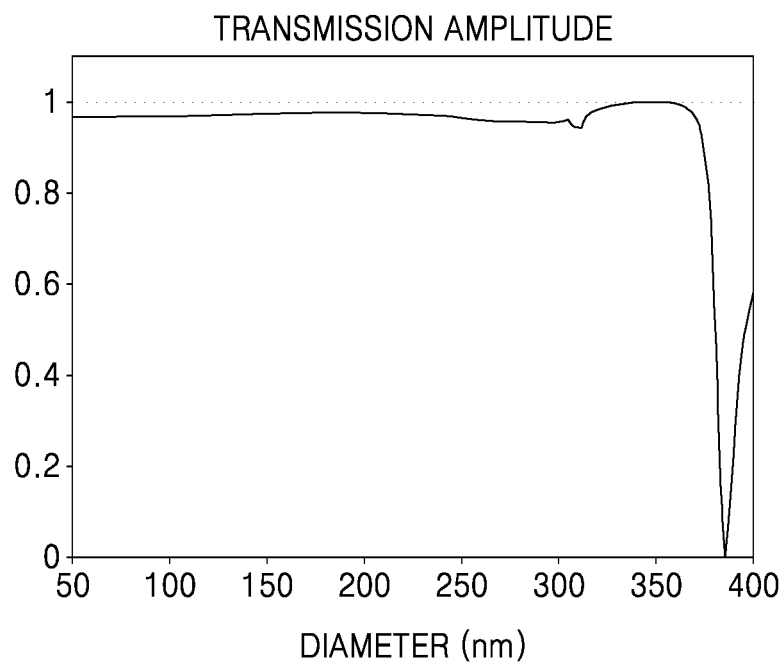
FIG. 6 is a graph showing a relationship between the diameter of a phase shift element of an exemplary rotary meta lens and the transmittance of the rotary meta lens.
Figure 7:
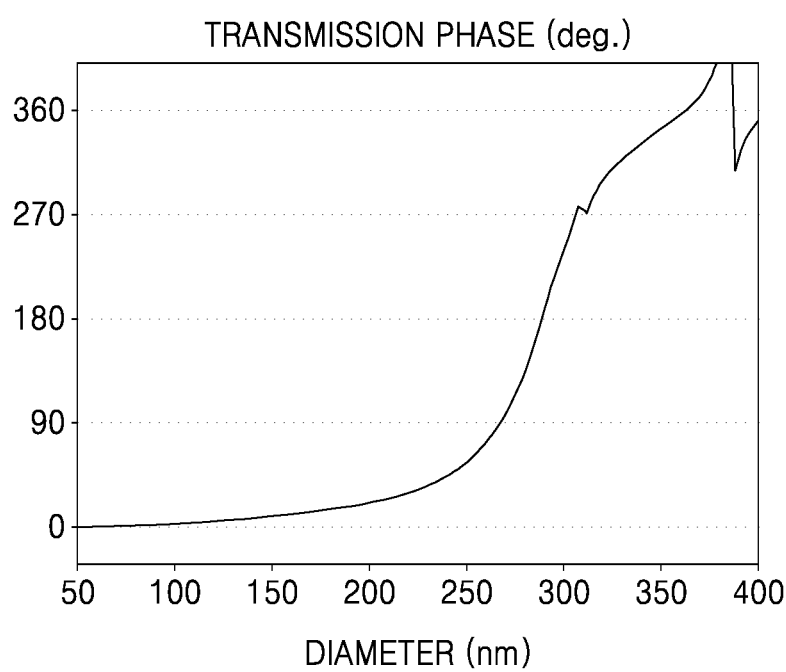
FIG. 7 is a graph showing a relationship between the diameter of one phase shift element of an exemplary rotary meta lens and the phase change of transmitted light.

FIG. 6 is a graph showing a relationship between the diameter of the phase shift element 23 of the rotary meta lens 20 and the transmittance of the rotary meta lens 20, and FIG. 7 is a graph showing a relationship between the diameter of one phase shift element 23 of the rotary meta lens 20 and the phase change of transmitted light. In the graphs of FIGS. 6 and 7, it is assumed that each phase shift element 23 is a cylinder including amorphous silicon, is arranged as a hexagonal lattice at a period of 650 nm, and has a thickness of 715 nm. Also, in the graphs of FIGS. 6 and 7, it is assumed that the wavelength of incident light is 950 nm. Referring to FIG. 6, when the diameter of each phase shift element 23 is approximately 350 nm or less, the rotary meta lens 20 has a very high transmittance close to about 0.95. Therefore, it may be seen that optical loss due to the rotary meta lens 20 is very small. Referring to FIG. 7, it may be seen that the phase shift element 23 has a nonlinear relationship between the diameter thereof and the phase change, but the phase change is generally increased as the diameter of the phase shift element 23 increases.

Therefore, when the plurality of phase shift elements 23 have different sizes or different thicknesses, the transmitted light transmitted through the rotary meta lens 20 may have different phases depending on the local position on the rotary meta lens 20 through which the light is transmitted. That is, the phase of the transmitted light changes locally depending on the position on the rotary meta lens 20. By appropriately arranging the plurality of phase shift elements 23 having different sizes or different thicknesses, it is possible to control, as desired, the wavefront of the transmitted light transmitted through the rotary meta lens 20. For example, depending on the arrangement of the phase shift elements 23, the rotary meta lens 20 may serve as a photorefractive device such as a prism. Also, when the arrangement of the phase shift elements 23 is different for each of a plurality of meta areas of the rotary meta lens 20, the direction in which light is refracted may be different for each of the plurality of meta areas.

Figure 8:
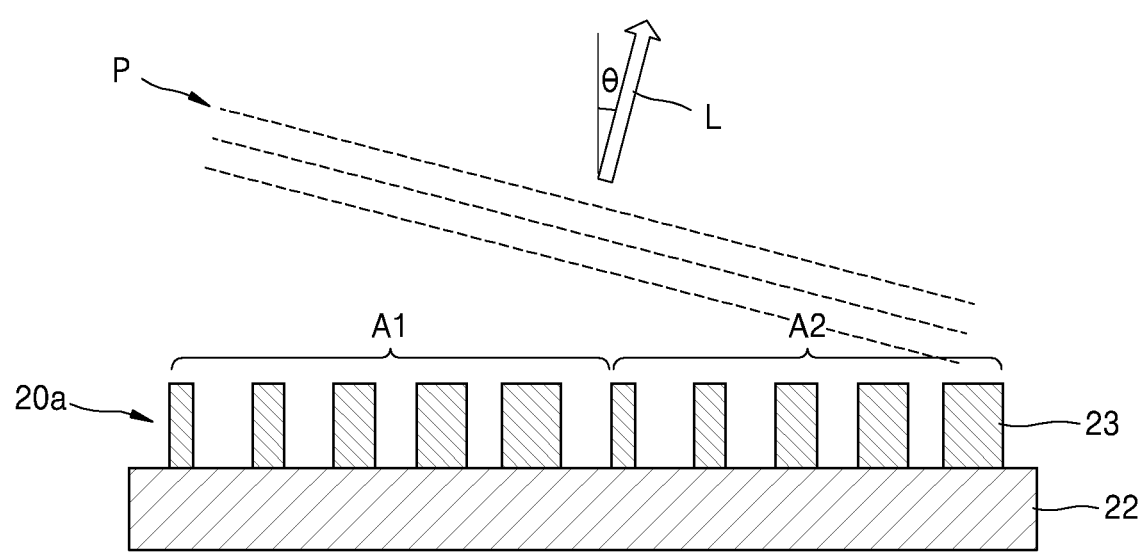
FIG. 8 is a cross-sectional view illustrating phase shift elements arranged in one meta area of an exemplary rotary meta lens.

FIG. 8 is a cross-sectional view illustrating phase shift elements 23 arranged in one meta area 20a of a rotary meta lens 20. Referring to FIG. 8, the meta area 20a may include at least two sub-areas A1 and A2 having the same arrangement of a plurality of phase shift elements 23. Although only two sub-areas A1 and A2 are shown in FIG. 8 for convenience, the meta area 20a may include a greater number of sub-areas.

In each of the sub-areas A1 and A2, the phase shift elements 23 may be arranged at regular intervals or at irregular intervals. When the phase shift elements 23 are two-dimensionally arranged in a regular pattern, the phase shift elements 23 may be arranged at regular intervals as, for example, in a square lattice or a hexagonal lattice. Furthermore, the interval between adjacent phase shift elements 23 may be less than the wavelength of incident light. By reducing the interval between adjacent phase shift elements 23, it is possible to suppress generation of higher order diffraction components.

A plurality of sub-areas A1 and A2 in one meta area 20a may be arranged at regular intervals. As a result, the phase of transmitted light varies depending on local spaces. The plurality of sub-areas A1 and A2 and the phase shift elements 23 arranged therein may be designed such that an equiphasic plane P connecting points having the same phase of transmitted light has a constant angle with respect to the rotary meta lens 20. Then, an optical path of the transmitted light may be changed to have a constant angle with respect to the incident light. For example, when the period of the sub-areas A1 and A2 is denoted by A, a refracting angle θ of the transmitted light L may have a relationship of sin θ=λ/Λ. Accordingly, when the period of the sub-areas A1 and A2 are different for each of a plurality of meta areas, the angle of refraction of light may be different for each of the plurality of meta areas.

Figure 9A:
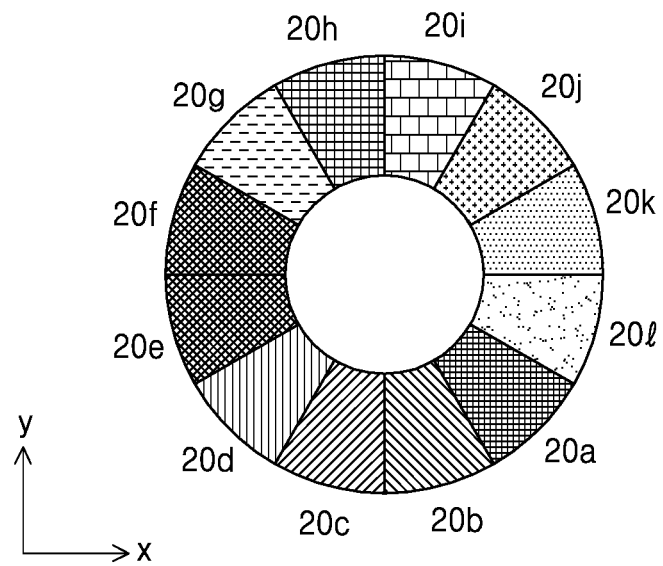
FIGS. 9A and 9B illustrate various meta areas of an exemplary rotary meta lens and the scanning distribution of transmitted light.
Figure 9B:
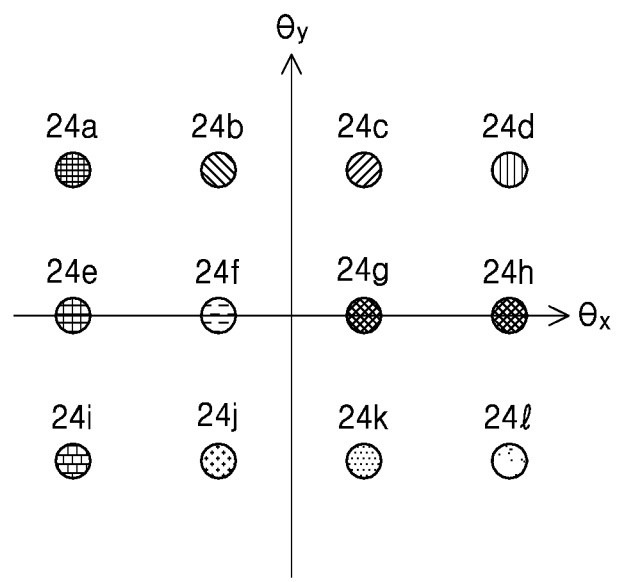

FIGS. 9A and 9B illustrate various meta areas 20a to 20l of the rotary meta lens 20 and the scanning distribution of transmitted light. Referring to FIG. 9A, the rotary meta lens 20 includes twelve meta areas 20a to 20l arranged in a circumferential direction. However, the rotary meta lens 20 may actually include a much greater number of meta areas. In FIG. 9A, the arc lengths of the meta areas 20a to 20l are all the same. However, if desired, the arc length of a certain meta area may be longer than the arc lengths of the other meta areas.

FIG. 9B illustrates the scanning distribution of transmitted light corresponding to the plurality of meta areas 20a to 20l of the rotary meta lens 20. When x indicates the horizontal direction of the rotary meta lens 20 and y indicates the vertical direction of the rotary meta lens 20, an optical path of the transmitted light may be represented by an angle θx in the x direction and an angle θy in the y direction. As shown in FIG. 9B, when the rotary meta lens 20 includes 12 meta areas, i.e., first to twelfth meta areas 20a to 20l, it is possible to scan the transmitted light with respect to 12 different locations, i.e., first to twelfth locations 24a to 24l whose angles θx and angles θy are different from one another. For example, when light passes through the first meta area 20a and then sequentially passes through the second through twelfth meta areas 20b to 20l as the rotary meta lens 20 rotates, the transmitted light may be sequentially scanned from the first location 24a to the twelfth location 24l. As described above, the magnitudes of the angles θx and θy may be determined by the period A of the sub-areas A1 and A2, and the directions x and y may be determined depending on the arrangement of the phase shift elements 23 arranged in the sub-areas A1 and A2. Therefore, the period of the sub-areas A1 and A2 or the arrangement of the phase shift elements 23 may be different for each of the plurality of meta areas 20a to 20l.

Figure 10A:
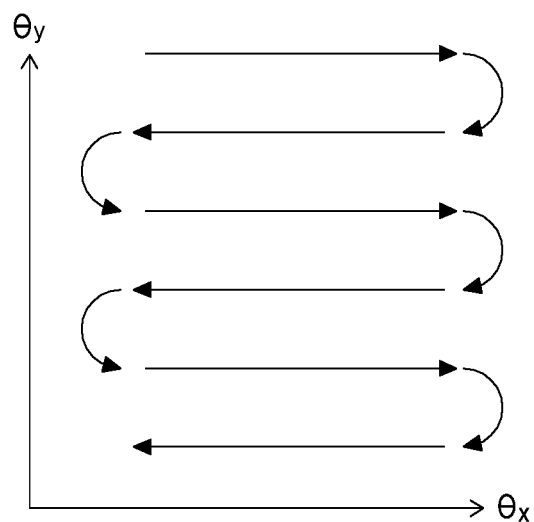
FIGS. 10A to 10C illustrate various scanning directions according to rotation of an exemplary rotary meta lens.
Figure 10B:
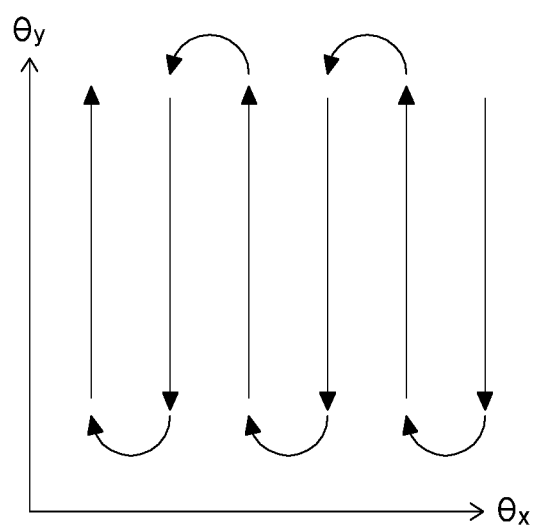
Figure 10C:
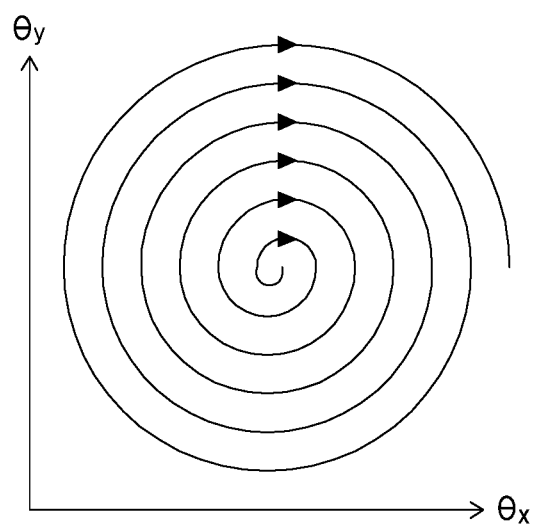

FIGS. 10A to 10C illustrate various scanning directions according to rotation of the rotary meta lens 20. In FIGS. 10A to 10C, arrows indicate sequential scanning directions. FIG. 10A illustrates a horizontal first raster scan method in which a scan starts from the uppermost side and is performed first in the positive horizontal direction (+x direction), then in the vertical direction (−y direction), and then in the negative horizontal direction (−x direction). However, various other scan methods may be performed depending on the arrangement of the meta areas 20a to 20l in the rotary meta lens 20. For example, FIG. 10B illustrates a vertical first raster scan method in which a scan starts from the rightmost side and is performed first in the negative vertical direction (−y direction), then in the negative horizontal direction (−x direction), and then in the positive vertical direction (+y direction). Also, as shown in FIG. 10C, a clockwise spiral scan method may be performed. The rotary meta lens 20 according to the present exemplary embodiment may freely select refraction angles of transmitted light by the plurality of meta areas 20a to 20l according to designs, and thus various types of scan may be performed. Therefore, the rotary meta lens 20 may be designed to perform an appropriate scan method according to the use of the beam scanning apparatus 110.

Figure 11A:
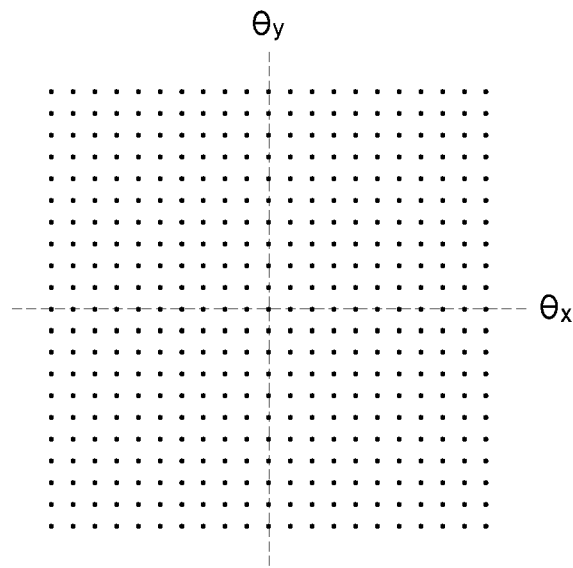
FIGS. 11A to 12B illustrate examples of various scan densities by an exemplary rotary meta lens.

FIGS. 11A to 12B illustrate examples of various scan densities by the rotary meta lens 20. As described above, since the refraction angles of the transmitted light by the plurality of meta areas 20a to 20l may be arbitrarily selected according to designs, the scan density as well as the scan method may be freely selected according to the use. For example, the rotary meta lens 20 may be designed to have a uniform scan density for the entire scan area of the beam scanning apparatus 110, as shown in FIG. 11A. In other words, the rotary meta lens 20 may be designed to scan transmitted light at equal intervals in both the horizontal direction θx and the vertical direction θy. To this end, the plurality of meta areas 20a to 20l may be configured such that scanning positions of transmitted light passing through the plurality of meta areas 20a to 20l are uniformly distributed over the entire scan area.

Figure 11B:
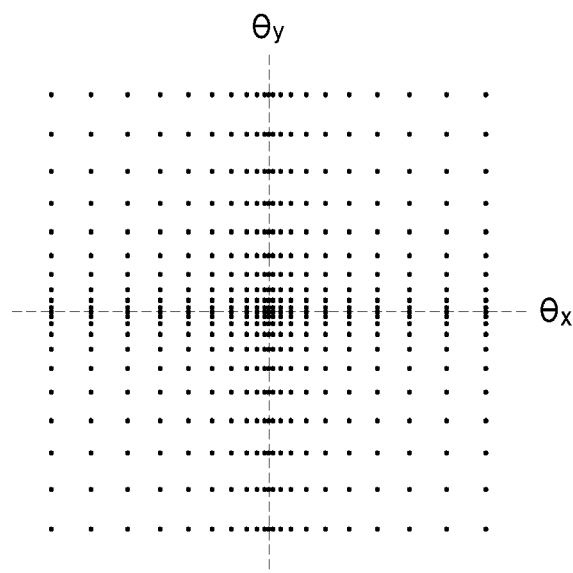

As shown in FIG. 11B, in connection with the distribution density of the scanning positions of the transmitted light passing through the plurality of meta areas 20a to 20l, the rotary meta lens 20 may be designed such that the scan density is high in a central part of the horizontal direction θx and a central part of the vertical direction θy and is decreased toward edges of the scanning area. That is, a central part in a scanning area may have a higher scan density than a peripheral part in the scanning area. For example, when the beam scanning apparatus 110 is used in a vehicle LiDAR apparatus, a front central area of a vehicle is an important factor, and thus the scan density for an important area may be increased and the scan density for an area having relatively low importance may be lowered.

Figure 12A:
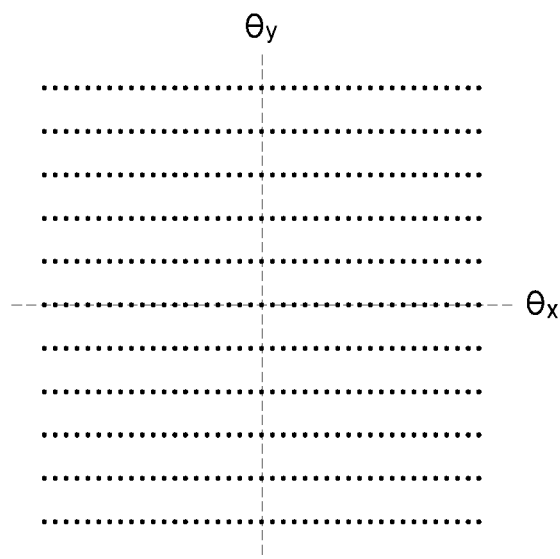
Figure 12B:
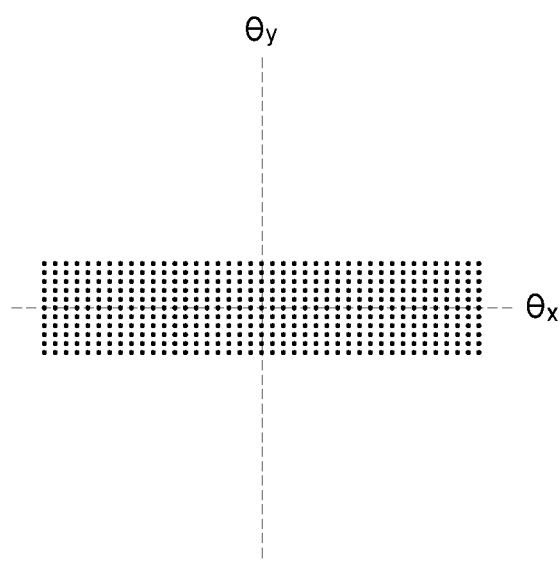

As shown in FIG. 12A, the rotary meta lens 20 may be designed to have a high scan density and high resolution in the horizontal direction θx and a low scan density and low resolution in the vertical direction θy. In addition, as shown in FIG. 12B, the rotary meta lens 20 may be designed to have a substantially uniform scan density, a wider scan range in the horizontal direction θx, and a narrower scan range in the vertical direction θy. The method shown in FIG. 12B may be useful, for example, in a vehicle LiDAR apparatus for obstacle detection of autonomous vehicles mainly operating on a plane.

As described above, the beam scanning apparatus 110 according to the present exemplary embodiment may scan a beam at various locations by rotating the rotary meta lens 20 having the plurality of meta areas 20a to 20l. Since an angle at which each of the meta areas 20a to 20l refracts transmitted light may be determined depending on the arrangement of the plurality of phase shift elements 23, it is possible to design, as desired, the distribution of locations in which light is scanned. For example, in the case of the vehicle LiDAR apparatus, in a front-view type LiDAR apparatus, to prevent a head-on collision, a central part in the entire scan range may be more densely scanned and a peripheral part in the entire scan range may be loosely scanned, and in a rear-view type LiDAR apparatus, the scan density at the central part and the scan density at the peripheral part may be equal to prevent collisions when changing lanes. In addition, since there is no limitation on a refraction angle of light in the plurality of meta areas 20a to 20l, the viewing angle of the beam scanning apparatus 110 according to the present exemplary embodiment may be improved as compared with that of a non-mechanical beam scanning apparatus.

In addition, the beam scanning apparatus 110 according to the present exemplary embodiment may be applied to light of various wavelengths according to the arrangement of the phase shift elements 23. For example, according to the design of the phase shift elements 23, the beam scanning apparatus 110 may be used in a wavelength range of any one selected from among visible light, near infrared rays, and infrared rays, or may be used in all wavelength ranges.

In the case of the beam scanning apparatus 110 according to the present exemplary embodiment, since the transmittance of the rotary meta lens 20 is as high as about 0.95, light loss is small and the possibility of damage to the rotary meta lens 20 due to light absorption is also low. Therefore, it is possible to use a high-power light source as the light source 121, and as a result, a sensing distance of the optical apparatus 100 may increase.

In addition, since the rotary meta lens 20 may be easily manufactured by patterning using lithography technology and etching technology, manufacturing cost of the beam scanning apparatus 110 may be reduced.

Also, since the rotary meta lens 20 has a symmetrical shape, the rotary meta lens 20 may be rotated at a high speed, thereby enabling high-speed scanning. A large number of meta areas 20a to 20l may be formed in the rotary meta lens 20, so that a very large number of areas may be scanned per unit time. For example, if the rotary meta lens 20 has 3,768 meta areas and rotates 60 times per second, 226,080 points may be scanned per second.

Figure 13A:
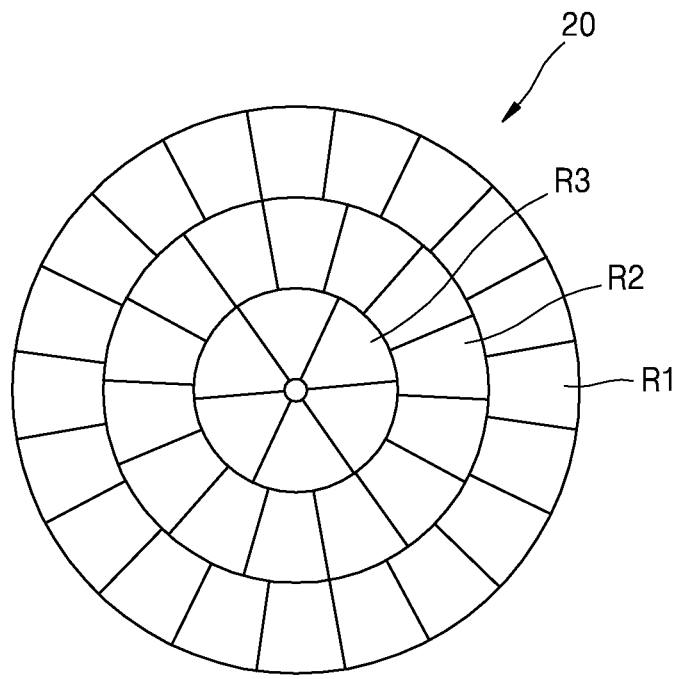
FIG. 13A is a plan view of a structure of a rotary meta lens according to another exemplary embodiment.

FIG. 13A is a plan view of a structure of a rotary meta lens 20 according to another exemplary embodiment. Referring to FIG. 13A, the rotary meta lens 20 may include a plurality of meta areas additionally divided and arranged in a radial direction of the substrate 22. For example, the rotary meta lens 20 may be divided into a first radial area R1, a second radial area R2, and a third radial area R3 from the outermost circumferential surface toward the center. Each of the radial areas R1, R2, and R3 may have a plurality of meta areas arranged in a circumferential direction. When the arc lengths of all meta areas are equal to one another, the number of meta areas arranged in the first radial area R1 at the outermost side of the rotary meta lens 20 may be greater than the number of meta areas arranged in the second and third radial areas R2 and R3 at relatively inner side of the rotary meta lens 20. Therefore, it is possible to arrange meta areas, which are most frequently used, in the first radial area R1 and arrange meta areas, which are relatively less frequently used, in the second radial area R2 and the third radial area R3.

When meta areas are arranged in the radial direction of the rotary meta lens 20, the light source 121 may be configured to be movable in the radial direction of the rotary meta lens 20. For example, while a beam is scanned using the first radial area R1, the light source 121 is arranged to face the first radial area R1. And then, when it is desired to scan the beam by using the second radial area R2, the light source 121 may be moved to face the second radial area R2.

Figure 13B:
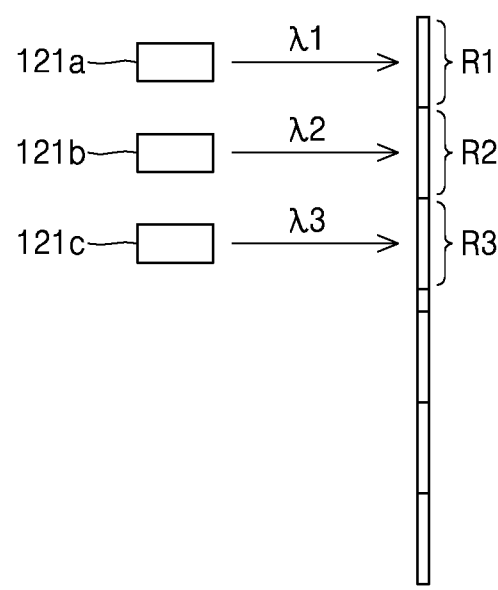
FIG. 13B illustrates another application example of the rotary meta lens shown in FIG. 13A.

Alternately, the optical apparatus 100 may include a separate light source arranged for each of the radial areas R1, R2, and R3. For example, FIG. 13B illustrates another application example of the rotary meta lens 20 shown in FIG. 13A. Referring to FIG. 13B, the optical apparatus 100 may include a first light source 121a arranged to face the first radial area R1, a second light source 121b arranged to face the second radial area R2, and a third light source 121c arranged to face the third radial area R3. Although the first to third light sources 121a, 121b and 121c may emit light of the same wavelength, the first to third light sources 121a, 121b and 121c may, alternately, emit light of different wavelengths. For example, when the weather is clear, scanning may be performed using the first radial area R1, and the first light source 121a, which provides light to the first radial area R1, may emit light of a first wavelength λ1 which is advantageous for clear weather. When the weather is cloudy, scanning may be performed using the second radial area R2 and the second light source 121b, which provides light to the second radial area R2, may emit light of a second wavelength λ2 which is advantageous for cloudy weather. In foggy or rainy weather, scanning may be performed using the third radial area R3 and the third light source 121c, which provides light to the third radial area R3, may emit light of a third wavelength λ3 which is advantageous for foggy or rainy weather. In addition, the radial areas R1, R2, and R3 and the light sources 121a, 121b, and 121c may be appropriately selected to match surrounding conditions such as daytime, nighttime, outdoors, tunnels, and underground.

Figure 14A:
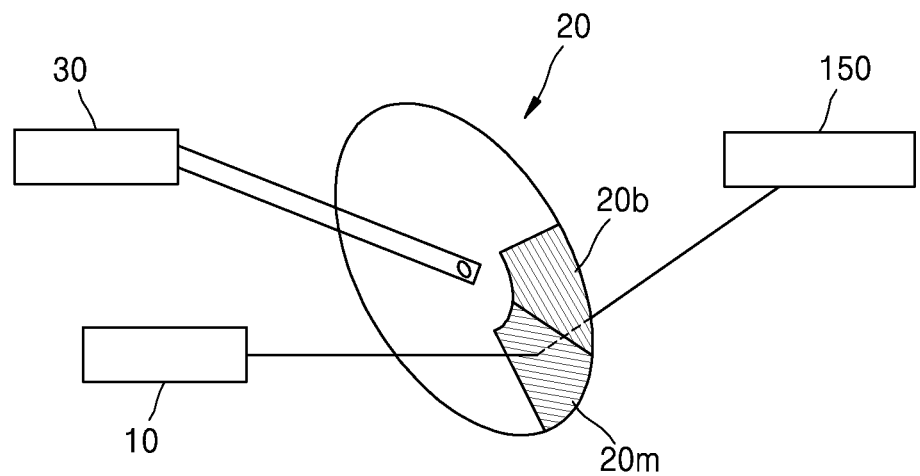
FIG. 14A is a block diagram of a beam scanning apparatus according to another exemplary embodiment.

FIG. 14A is a block diagram of a beam scanning apparatus 110 according to another exemplary embodiment. Referring to FIG. 14A, the beam scanning apparatus 110 may further include a synchronization device 150 for accurately sensing the rotation of a rotary meta lens 20. Since the rotary meta lens 20 rotates at a high speed, it may be important for the computer 130 to accurately grasp a point to be scanned at each point in time. Otherwise, for example, an identified object and information about a distance to the identified object may not match.

Figure 14B:
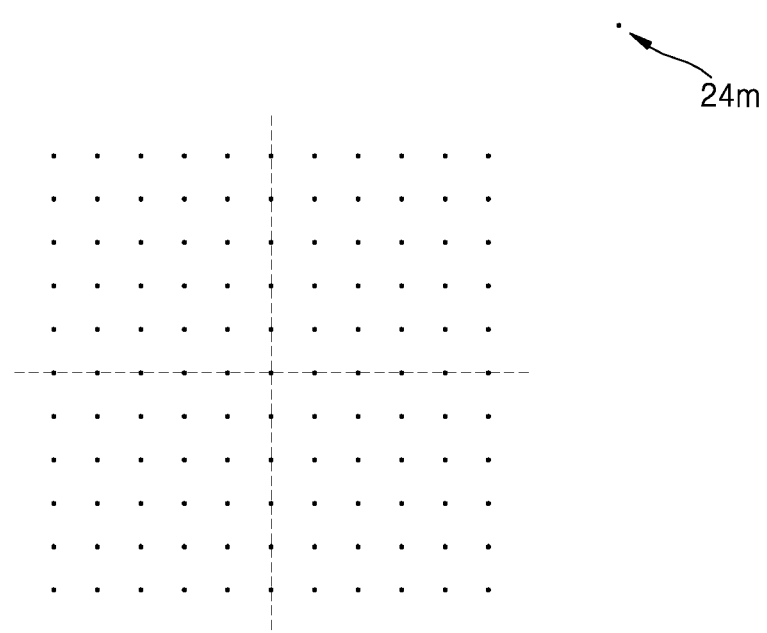
FIG. 14B illustrates the scan distribution of transmitted light by a rotary meta lens in the beam scanning apparatus of FIG. 14A.

To this end, one meta area 20m of a plurality of meta areas of the rotary meta lens 20 directs transmitted light to the synchronization device 150. For example, FIG. 14B illustrates the scan distribution of transmitted light by the rotary meta lens 20 in the beam scanning apparatus 110 of FIG. 14A. As shown in FIG. 14B, although the scanning position of most of the transmitted light is located in a scanning area, transmitted light transmitted through the meta area 20m may be directed to a location 24m of the synchronization device 150, outside of the scanning area. The synchronization device 150 may include a separate photodetector for sensing the light transmitted through the meta area 20m. Alternately, the synchronization device 150 may omit the separate photodetector but instead include a mirror that reflects the transmitted light, transmitted through the meta area 20m, toward the photodetector 122. Then, the synchronization device 150 may sense light whenever the meta area 20m crosses an optical path. A light sensing signal in the synchronization device 150 may be transmitted to the computer 130 of the optical apparatus 100, and based on the light sensing signal, the computer 130 may calculate a rotation speed of the rotary meta lens 20 and may calculate a current relative rotation angle of the rotary meta lens 20 based on the meta area 20m.

Figure 15:
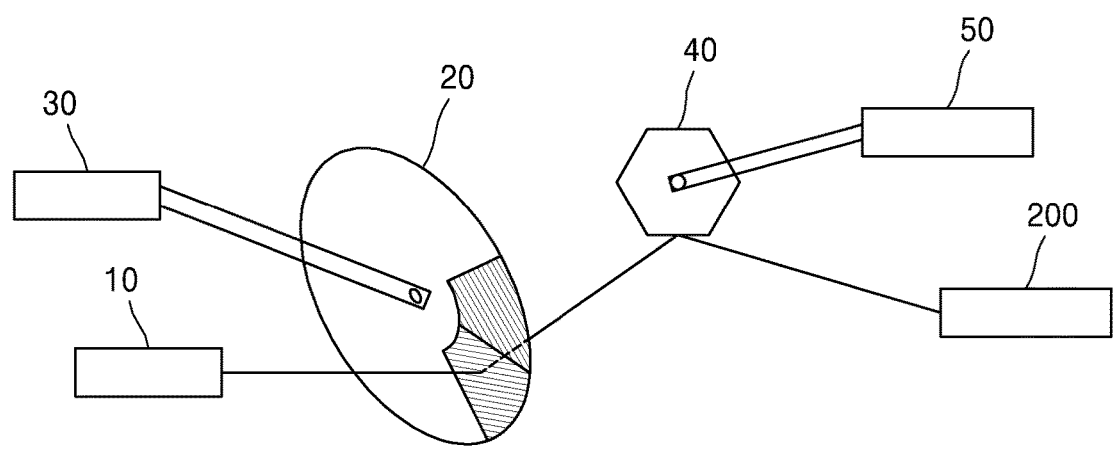
FIG. 15 is a block diagram of a beam scanning apparatus according to another exemplary embodiment.

FIG. 15 is a block diagram of a beam scanning apparatus 110 according to another exemplary embodiment. Referring to FIG. 15, the optical apparatus 100 may further include a rotating polygonal mirror 40 and an additional rotation drive device 50 for rotating the polygonal mirror 40. The polygonal mirror 40 may reflect light transmitted through a rotary meta lens 20 and may scan the light in one direction. Since light travels in different directions according to the plurality of meta areas of the rotary meta lens 20, the rotary meta lens 20 and the polygonal mirror 40 may be located close enough so that light transmitted through the rotary meta lens 20 may always be incident on the polygonal mirror 40.

When only the rotary meta lens 20 is used, a plurality of scanning points are discretely distributed in a scanning area. That is, the plurality of scan points are spaced apart from each other. However, when the rotary meta lens 20 and the polygonal mirror 40 are used together, scanning may be continuously performed in one direction. That is, since the polygon mirror 40 provides a continuous scan, it is possible to have very high resolution in one direction. For example, the polygonal mirror 40 may perform a scan in a first direction requiring high resolution, and the rotary meta lens 20 may perform a scan in a second direction perpendicular to the first direction. Therefore, two-dimensional (2D) scanning may be performed with only two rotational operations without any linear operation. For example, when the beam scanning apparatus 110 is used in a vehicle LiDAR apparatus, it is advantageous that scan resolution in the horizontal direction θx is higher than scan resolution in the vertical direction θy, and thus, the beam scanning apparatus 110 may be configured such that the polygon mirror 40 rotates in the horizontal direction θx and the rotary meta lens 20 performs a scan in the vertical direction θy.

Figure 16:
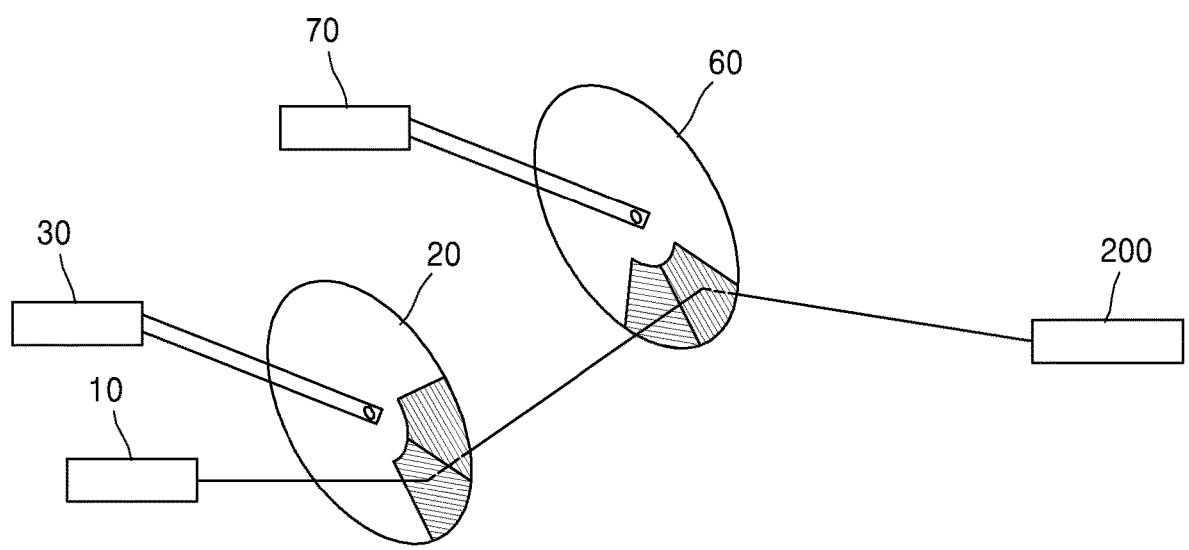
FIG. 16 is a block diagram of a beam scanning apparatus according to another exemplary embodiment.

FIG. 16 is a block diagram of a beam scanning apparatus 110 according to another exemplary embodiment. Referring to FIG. 16, the beam scanning apparatus 110 may include two rotary meta lenses, i.e., first and second rotary meta lenses 20 and 60, and two rotation drive devices 30 and 70 for respectively rotating the two rotary meta lenses 20 and 60. The first rotary meta lens 20 may include a plurality of meta areas for refracting light in different directions, and the second rotary meta lens 60 may also include a plurality of meta areas for refracting light in different directions. Each meta area of the first and second rotary meta lenses 20 and 60 may include an array of a plurality of phase shift elements, as described above.

Light is transmitted through the second rotary meta lens 60 after being transmitted through the first rotary meta lens 20. Since the light travels in different directions according to the plurality of meta areas of the first rotary meta lens 20, the first rotary meta lens 20 and the second rotary meta lens 60 may be located close enough so that the light transmitted through the first rotary meta lens 20 is always incident on the second rotary meta lens 60. The light travels again in the other direction by the meta areas of the second rotary meta lens 60. By using the two rotary meta lenses 20 and 60, the number of points that may be scanned may increase. For example, the total number of points that may be scanned may be a multiple of the number of points that may be scanned with the first rotary meta lens 20 and the number of points that may be scanned with the second rotary meta lens 60. When the number of points to be scanned is very large, in order to scan a large number of points by using only one rotary meta lens, the diameter of the one rotary meta lens has to be increased. When two rotary meta lenses 20 and 60 are used, the number of points that may be scanned may be increased without increasing the diameter of each of the rotary meta lens 20 and 60.

Figure 17:
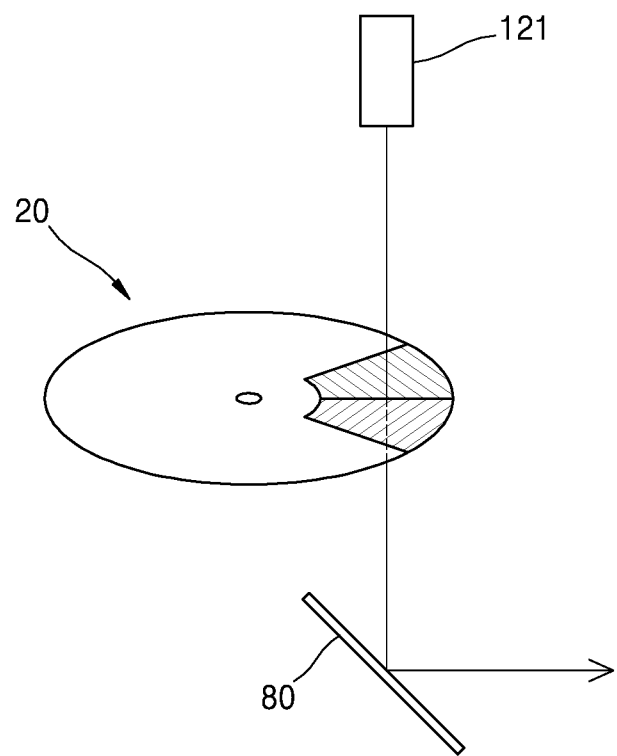
FIG. 17 is a block diagram of a beam scanning apparatus according to another exemplary embodiment.

FIG. 17 is a block diagram of a beam scanning apparatus 110 according to another exemplary embodiment. Referring to FIG. 17, the beam scanning apparatus 110 may include a rotary meta lens 20 having a rotation axis arranged to be perpendicular to the ground and a mirror 80 for reflecting light transmitted through the rotary meta lens 20 in a horizontal direction. For example, the rotation axis of the rotary meta lens 20 may be parallel to the vertical direction θy and the mirror 80 may be arranged to reflect light in the horizontal direction θx. To this end, a disc surface of the rotary meta lens 20 may be arranged to be parallel to the horizontal direction θx, and the mirror 80 may have a reflective surface inclined at 45 degrees to the rotation axis of the rotary meta lens 20.

For example, when the beam scanning apparatus 110 is used in a vehicle LiDAR apparatus, the beam scanning apparatus 110 vibrates in the vertical direction θy because the vibration of a vehicle generally occurs in the vertical direction θy. If the rotation axis of the rotary meta lens 20 is parallel to the horizontal direction θx, a force may be generated in a lateral direction of the rotary meta lens 20 when a force oscillating in the vertical direction θy is applied to the rotary meta lens 20, and thus the operation of the rotary meta lens 20 may become unstable. Therefore, when the rotation axis of the rotary meta lens 20 is aligned with a vibration direction, the rotary meta lens 20 may be more stably operated.

Figure 18:
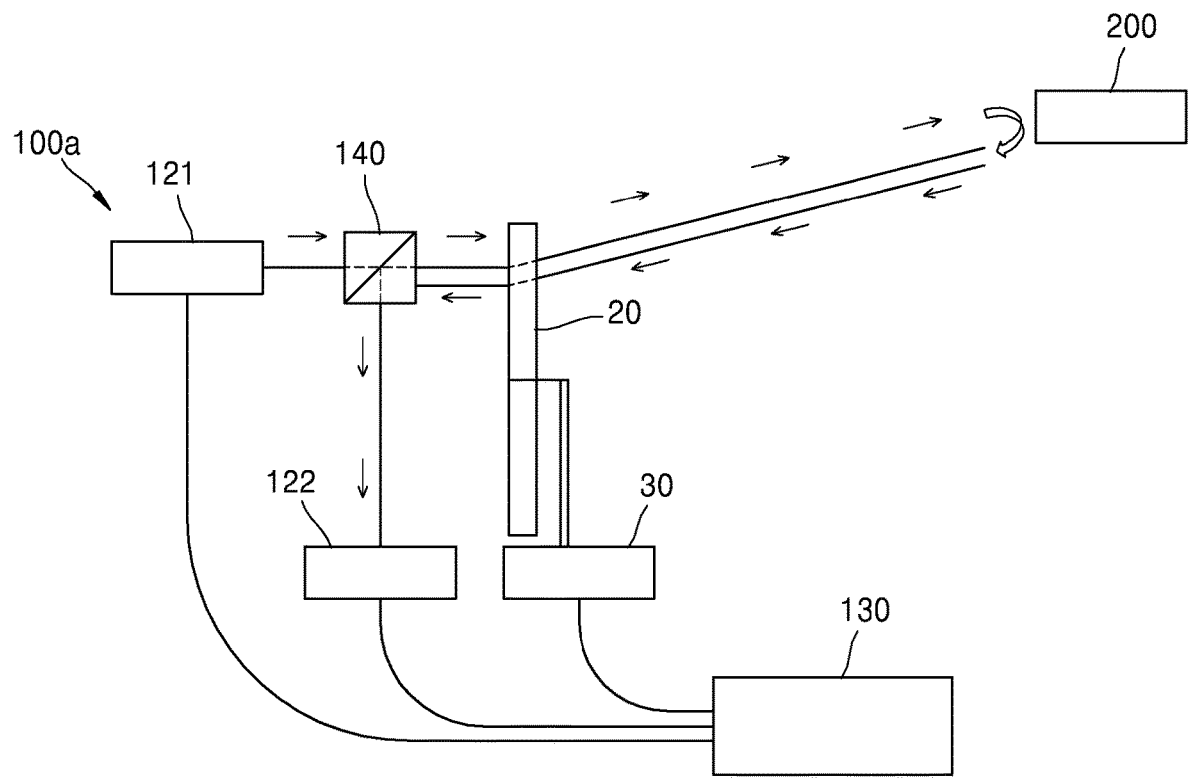
FIG. 18 is a block diagram of a structure of an optical apparatus according to another exemplary embodiment.

FIG. 18 is a block diagram of a structure of an optical apparatus 100a according to another exemplary embodiment. Referring to FIG. 18, the optical apparatus 100a has an optical co-axial structure. The optical co-axial structure denotes a structure in which a part that scans light and a part that detects the light share a light path. To this end, the optical apparatus 100a may include a beam splitter 140, and a photodetector 122 and a light source 121 may be arranged to face different sides of the beam splitter 140. For example, the beam splitter 140 may be arranged between the light source 121 and a rotary meta lens 20, and may transmit light emitted from the light source 121 and send the transmitted light to a rotary meta lens 20. Also, the beam splitter 140 may reflect light reflected from an external object and send the reflected light to the photodetector 122. To this end, the beam splitter 140 may be a half mirror or a polarizing beam splitter that transmits or reflects light in accordance with a polarization component of the light. In this structure, the light emitted from the light source 121 may be incident on the object 200 through the beam splitter 140 and the rotary meta lens 20. A part of light scattered and reflected by the object 200 may be reflected again by the beam splitter 140 through the rotary meta lens 20 and detected by the photodetector 122. In the optical co-axial structure, since the field of view of the light source 121 and the field of view of the photodetector 122 coincide with each other, accurate measurement may be performed with the photodetector 122 having a relatively small size.

Figure 19:
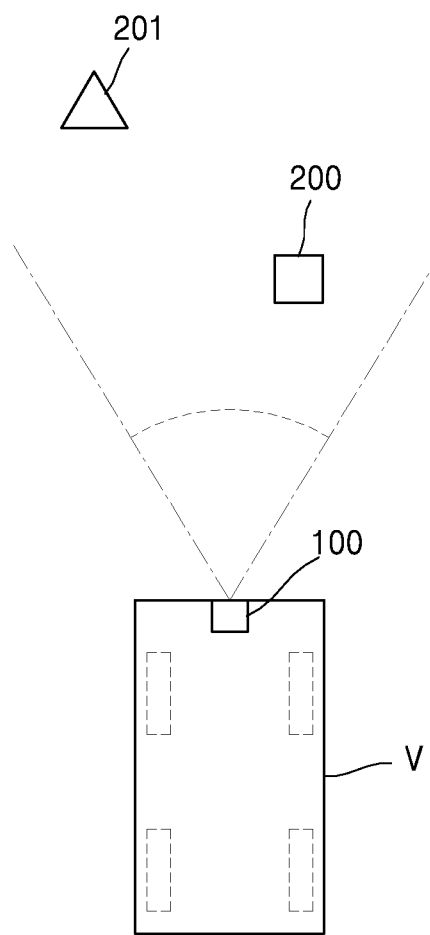
FIG. 19 illustrates an example in which an optical apparatus according to an exemplary embodiment is used as a vehicle light detection and ranging (LiDAR) apparatus.

As described above, the optical apparatus 100 or 100a according to exemplary embodiments described herein may be applied to any of various fields such as a vehicle LiDAR apparatus, a robot LiDAR apparatus, a drone LiDAR apparatus, a depth sensor, a security intruder detection system, a subway door obstacle detection system, a face recognition sensor, and a motion recognition and object profiling device. FIG. 19 illustrates an example in which the optical apparatus 100 or 100a according to an exemplary embodiment is used as a vehicle LiDAR apparatus. Referring to FIG. 19, the optical apparatus 100 or 100a may be mounted on a vehicle V and may scan a beam in a forward direction of the vehicle V to thereby detect various objects in front.

While a beam scanning apparatus and an optical apparatus including the same have been described with reference to the exemplary embodiments illustrated in the drawings, it will be understood by those of ordinary skill in the art that these are only examples, and various changes in form and details may be made therein without departing from the spirit and scope as defined by the following claims. Therefore, embodiments described herein should be considered in a descriptive sense only and not for purposes of limitation. The scope of the present disclosure is defined not by the detailed description of the invention but by the appended claims, and all differences within the scope will be construed as being included in the present disclosure.

What is claimed is:

1. A beam scanning apparatus comprising:
    a rotary meta lens comprising a plurality of meta areas, each of the plurality of meta areas comprising a plurality of fine phase shift elements arranged therein; and
    a rotation drive device configured to rotate the rotary meta lens,
    wherein a first meta area of the plurality of meta areas is configured to direct light transmitted therethrough to a first location within a scanning area and a second meta area of the plurality of meta areas is configured to direct light transmitted therethrough to a second location within the scanning area, different from the first location,
    wherein the rotary meta lens comprises a transparent substrate having a disc shape, and the plurality of meta area are arranged in a circumferential direction of the substrate,
    wherein the plurality of meta areas are a plurality of inner meta areas, each disposed at a first radial distance of the transparent substrate, and the rotary meta lens further comprises a plurality of outer meta areas, each disposed at a second radial distance of the transparent substrate, different from the first radial distance of the transparent substrate, and
    wherein the beam scanning apparatus further comprises a first light source facing to the first radial distance of the transparent substrate and a second light source facing to the second radial distance of the transparent substrate.

2. The beam scanning apparatus of claim 1, wherein an arrangement of the plurality of fine phase shift elements in the first meta area is different from an arrangement of the plurality of fine phase shift elements in the second meta area.

3. The beam scanning apparatus of claim 2, wherein each of the plurality of fine phase shift elements comprises a column arranged on the transparent substrate and each of the plurality of fine phase shift elements has a refractive index that is higher than a refractive index of the transparent substrate.

4. The beam scanning apparatus of claim 2, wherein each of the plurality of meta areas comprises a first sub-area and a second sub-area, each of the first sub-area and the second sub-area comprising a same arrangement of the plurality of fine phase shift elements.

5. The beam scanning apparatus of claim 4, wherein a period of the first sub-area and the second sub-area is different for each of the plurality of meta areas.

6. The beam scanning apparatus of claim 1, wherein the plurality of meta areas are configured such that light transmitted through the plurality of meta areas is directed to a plurality of scanning positions that are uniformly distributed within the scanning area.

7. The beam scanning apparatus of claim 1, wherein the plurality of meta areas are configured such that light transmitted through the plurality of meta areas is directed to a plurality of scanning positions within the scanning area, wherein a distribution density of the plurality of scanning positions in a central part of the scanning area is higher than a distribution density of the plurality of scanning positions in a peripheral part of the scanning area.

8. The beam scanning apparatus of claim 1, wherein the rotation drive device is a first rotation device, and the beam scanning apparatus further comprises:
    a polygon mirror that reflects light transmitted through the rotary meta lens and scans the light in one direction; and
    a second rotation drive device that rotates the polygonal mirror.

9. The beam scanning apparatus of claim 1, wherein the rotary meta lens is a first rotary meta lens and the rotation drive device is a first rotation drive device, and the beam scanning apparatus further comprises:

a second rotary meta lens that is configured to change a traveling direction of light transmitted through the second rotary meta lens; and a second rotation drive device that rotates the second rotary meta lens.

10. The beam scanning apparatus of claim 9, wherein the second rotary meta lens comprises a second plurality of meta areas, each of the second plurality of meta areas comprising a plurality of fine phase shift elements arranged therein, and the second plurality of meta areas of the second rotary meta lens are configured to direct light transmitted therethrough to different locations within a scanning area.

11. The beam scanning apparatus of claim 1, further comprising a mirror that reflects light transmitted through the plurality of meta areas, wherein the mirror comprises a reflective surface inclined at about 45 degrees with respect to a rotation axis of the rotary meta lens.

12. An optical apparatus comprising:

a light source;

a beam scanning apparatus that scans light emitted from the light source; and a photodetector that senses light emitted from the light source and reflected from an external object, wherein the beam scanning apparatus comprises:

a rotary meta lens comprising a plurality of meta areas, each of the plurality of meta areas comprising plurality of fine phase shift elements arranged therein; and a rotation drive device configured to rotate the rotary meta lens, wherein a first meta area of the plurality of meta areas is configured to direct light transmitted there through to a first location within a scanning area and a second meta area of the plurality of meta areas is configured to direct light transmitted therethrough to a second location within the scanning area, wherein the rotary meta lens comprises a transparent substrate having a disc shape, and the plurality of meta areas are arranged in a circumferential direction of the substrate, wherein the plurality of meta areas are a plurality of inner meta areas, each disposed at a first radial distance of the transparent substrate, and the rotary meta lens further comprises a plurality of outer meta areas, each disposed at a second radial distance of the transparent substrate, different from the first radial distance of the transparent substrate, and wherein the light source comprises a first light source facing to the first radial distance of the transparent substrate and a second light source facing to the second radial distance of the transparent substrate.

13. The optical apparatus of claim 12, further comprising a beam splitter, disposed between the light source and the rotary meta lens, wherein the beam splitter transmits the light emitted from the light source to the rotary meta lens and transmits or reflects light reflected from an external object to the photodetector.

14. The optical apparatus of claim 12, further comprising a calculator that calculates information about a location of an external object, based on a measurement result of the photodetector.

15. The optical apparatus of claim 12, wherein an arrangement of the plurality of fine phase shift elements in the first meta area is different from an arrangement of the plurality of fine phase shift elements in the second meta area.

16. The optical apparatus of claim 12, wherein each of the plurality of fine phase shift elements comprises a column arranged on the transparent substrate and each of the plurality of fine phase shift elements has a refractive index that is higher than a refractive index of the transparent substrate.

17. The optical apparatus of claim 12, wherein the plurality of meta areas are additionally arranged in a radial direction of the substrate.

18. The optical apparatus of claim 12, wherein the rotation drive device is a first rotation device, and the beam scanning apparatus further comprises:

a polygon mirror that reflects light transmitted through the rotary meta lens and scans the light in one direction; and a second rotation drive device that rotates the polygonal mirror.

19. The optical apparatus of claim 12, wherein the rotary meta lens is a first rotary meta lens and the rotation drive device is a first rotation drive device, and the beam scanning apparatus further comprises:

a second rotary meta lens that is configured to change a traveling direction of light transmitted through the second rotary meta lens; and a second rotation drive device that rotates the second rotary meta lens.

20. The optical apparatus of claim 12, wherein the beam scanning apparatus further comprises a mirror that reflects light transmitted through the plurality of meta areas, wherein the mirror comprises a reflective surface inclined at about 45 degrees with respect to a rotation axis of the rotary meta lens.

21. The optical apparatus of claim 12, further comprising a synchronization device that senses a rotation of the rotary meta lens, wherein one of the plurality of meta areas of the rotary meta lens is configured to direct light emitted from the light source toward the synchronization device.

22. The optical apparatus of claim 12, wherein the optical apparatus is one of a distance sensor and a three-dimensional sensor.

* * * * *